US011115812B2

(12) United States Patent
An et al.

(10) Patent No.: US 11,115,812 B2
(45) Date of Patent: Sep. 7, 2021

(54) SMART PROFILE CHANGE BY SUBSCRIBER IDENTITY MODULE (SIM) APPLICATION

(71) Applicant: T-Mobile USA, Inc., Bellevue, WA (US)

(72) Inventors: Kyeong Hun An, Sammamish, WA (US); Mathew George, Kirkland, WA (US); Phani Ramisetty, Sammamish, WA (US); Nilesh Ranjan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 163 days.

(21) Appl. No.: 16/573,753

(22) Filed: Sep. 17, 2019

(65) Prior Publication Data

US 2021/0084487 A1     Mar. 18, 2021

(51) Int. Cl.
| | |
|---|---|
| *H04W 8/26* | (2009.01) |
| *H04W 8/24* | (2009.01) |
| *H04W 4/14* | (2009.01) |
| *H04W 8/04* | (2009.01) |
| *H04W 8/18* | (2009.01) |

(52) U.S. Cl.
CPC ............. *H04W 8/265* (2013.01); *H04W 4/14* (2013.01); *H04W 8/04* (2013.01); *H04W 8/183* (2013.01); *H04W 8/24* (2013.01)

(58) Field of Classification Search
CPC ......... H04W 8/265; H04W 8/24; H04W 4/14; H04W 8/04; H04W 8/183
See application file for complete search history.

(56) References Cited

U.S. PATENT DOCUMENTS

2018/0124692 A1* 5/2018 Tan .................... H04W 52/0229
2019/0268755 A1* 8/2019 Namiranian .......... H04W 12/35

FOREIGN PATENT DOCUMENTS

WO     WO-2018183332 A1 * 10/2018     ............ H04W 64/00

* cited by examiner

*Primary Examiner* — Pao Sinkantarakorn
*Assistant Examiner* — Kabir U Jahangir
(74) *Attorney, Agent, or Firm* — Lee & Hayes, P.C.

(57) ABSTRACT

Systems and methods discussed herein are directed to subscriber identity (SIM) cards that include multiple profiles. The SIM cards include logic, e.g., an application or an applet, configured to change profiles so that the correct profile is selected for use with the electronic device that includes such a SIM card within the appropriate wireless communication network. The ability to change profiles may be based on activity of the electronic device, e.g., events, within the wireless communication network.

20 Claims, 5 Drawing Sheets

SMART PROFILE CHANGE BY SUBSCRIBER IDENTITY MODULE (SIM) APPLICATION

BACKGROUND

As is known, there are multiple operators of wireless communication networks from which customers may elect to obtain service. In order to obtain service, a customer's subscriber identity module (SIM) card may be placed within an electronic device, e.g., a smartphone or tablet, that the customer uses for service within a chosen wireless communication network. The SIM card contains an operator profile that corresponds to the chosen wireless communication network based on the operator of the wireless communication network. Thus, when the customer activates the electronic device, the SIM card communicates with the wireless communication network, which verifies the operator profile on the SIM card.

However, there are needs for operators of wireless communication networks to support multiple carrier networks, e.g., multiple brands of wireless communication networks that are operated by different operators. This results in the need to support multiple brands by carrying multiple different SIM cards in stock, each SIM card having its own stock keeping unit (SKU). This is due to the fact that currently SIM cards can only contain one operator profile, thus requiring operators of wireless communication networks to carry the multiple SIM cards with multiple SKUs. Customer service representatives therefore need to pick the correct SIM card for different customers for different brands of wireless communication networks. This can result in a high cost to the operators of wireless communication networks in managing inventory of SIM cards with multiple SKUs, as well as potential mistakes by customer service representatives resulting in degraded user experiences.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture described herein provide for subscriber identity (SIM) cards that include multiple profiles. The SIM cards include logic, e.g., an application or an applet, configured to change profiles among multiple profiles so that the correct profile is selected for use with the electronic device that includes such a SIM card within the appropriate wireless communication network. The ability to change profiles may be based on activity of the electronic device, e.g., events, within the wireless communication network.

In particular, SIM cards that include multiple profiles may be manufactured at the SIM card manufacturing site. The profiles may relate to operators of wireless communication networks, brands of electronic devices, operating systems for electronic devices, etc., and may be referred to as SIM profiles. When an electronic device is trying to operate within a wireless communication network, a first profile may be activated on the wireless communication system. For example, the sample profile may be activated at, e.g., registered with, one or more nodes, such as, for example, a home location register (HLR) node, a billing node, and/or an over-the-air (OTA) platform.

After the electronic device is activated, e.g., turned on, logic included on the SIM card, e.g., an application or applet, configured as a profile change application, may receive events from the electronic device. For example, a location status update, which includes location information from the wireless communication network, may be received by the electronic device and provided to the SIM card. Additionally, status commands may be received by the electronic device from the wireless communication network. As is known, the status commands are periodic commands that are periodically sent from the wireless communication network to the electronic device. The status command generally relates to the status of the electronic device within the wireless communication network, e.g., is the electronic device authorized to operate or receive service, within the wireless communication network.

The profile change application may send a message or notification, e.g., a short message service (SMS) message, to the OTA platform of the wireless communication network once it receives a location status update. If the sending of the SMS message is successful, then the current profile is maintained and the profile change application may be disabled. For example, if the SMS message goes through the wireless communication network, this indicates the SMS message is successful. If the SMS message is not successful, the electronic device returns an error to the SIM card so the SIM card and the/or the profile change application knows the current profile is not currently activated in the wireless communication network's billing platform.

If the SMS message is unsuccessful, as periodic status commands are received by the electronic device, after a predetermined number, e.g., threshold, of status commands, the profile change application may send another message or notification, e.g., a SMS message, to the OTA platform of the wireless communication network. If the sending of the second SMS message is unsuccessful, then the profile change application may switch to, e.g., activate, another profile on the SIM card. The profile change application may refresh and the process may then repeat.

For example, the electronic device may receive another location status update from the wireless communication network and provide it to the SIM. Based upon the location status update, the profile change application may again send a SMS to the OTA platform. If the SMS is successful, thereby indicating that the SIM card is utilizing the appropriate profile for the wireless communication network, then the SIM card will continue to use the current operator profile, e.g., connectivity with the wireless communication network may be maintained, and the profile change application may be disabled. However, if the location event is not successful, then the profile change application may wait for status commands until a predetermined number of status commands are received. Once the predetermined number or threshold of status commands have again been received, then the profile change application may send a SMS to the OTA platform. If the SMS message is successful, then the current profile may be maintained, e.g., connectivity with the wireless communication network may be maintained, and the profile change application may be disabled. If not, then the process may repeat until the correct SIM profile is selected. In configurations, the process may repeat based at least in part on a threshold number of new profiles not being previously selected, e.g., the total number of profiles on the SIM card.

In configurations, a user of the electronic device may manually switch profiles. In such configurations, a user interface may be presented to the user and the user interface may ask the user if they wish to switch profiles. Additionally, a list of profiles may be presented to the user from which the user may select a desired profile. This can allow for the user to operate the electronic device within multiple wireless communication networks and manually switch to the appropriate profile depending on the operator of the wireless communication network. In such configurations, the profile change application may be disabled prior to manual switching of profiles by the user.

Figure 1:
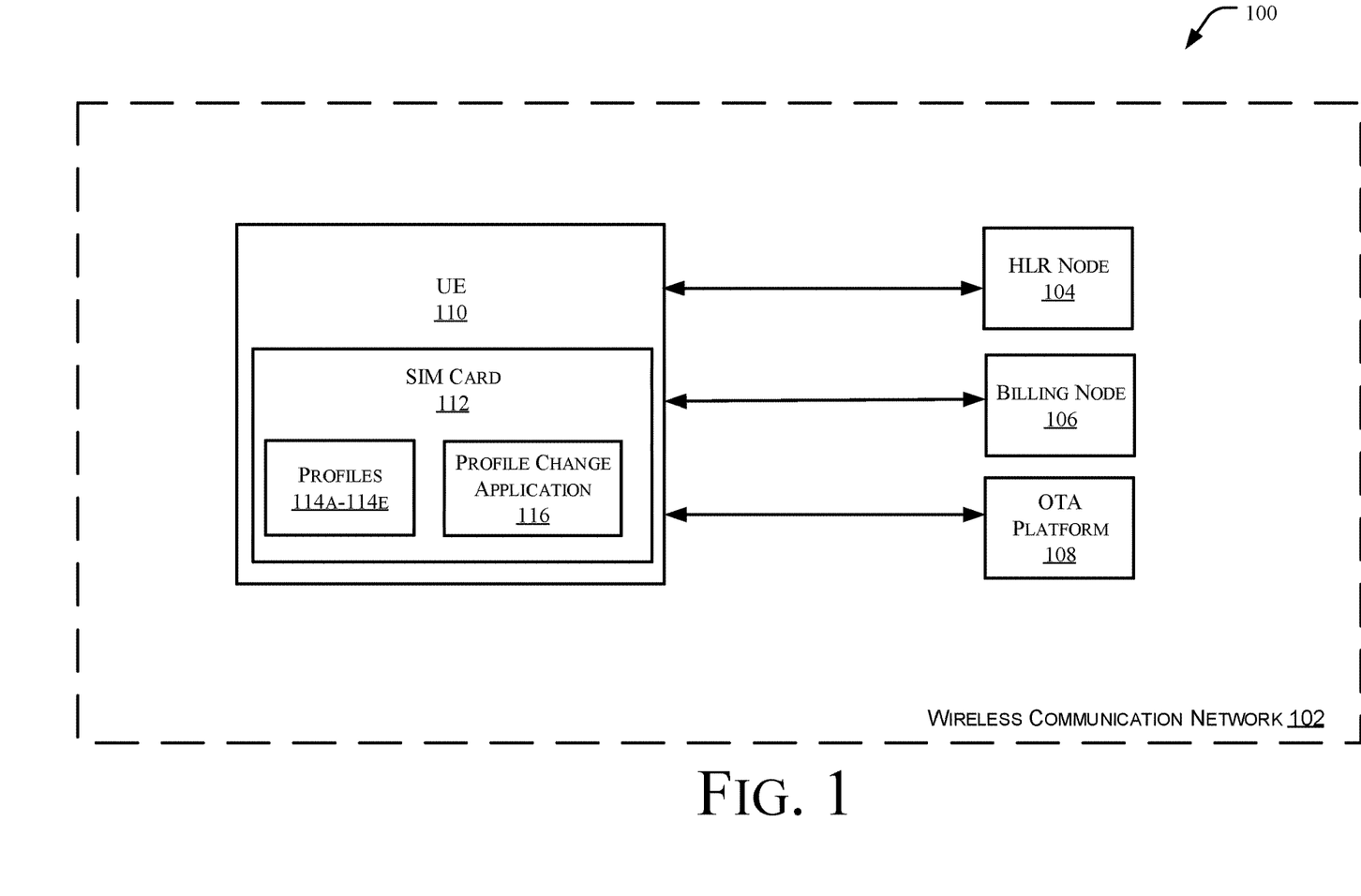
FIG. 1 schematically illustrates an example arrangement of a wireless communication network including an electronic device that includes a SIM card having multiple profiles, in accordance with various configurations.

FIG. 1 schematically illustrates an example arrangement 100 of a wireless communication network 102. The wireless communication network includes multiple nodes. In the example arrangement 100 of FIG. 1, only three nodes are illustrated: a home location register (HLR) node 104, a billing node 106, and a node configured as an over-the-air (OTA) platform 108.

A UE 110 is also illustrated in FIG. 1. The UE 110 includes a "classical," e.g., physical, subscriber identity module (SIM) card 112. The UE 110 may comprise an electronic device implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices.

The SIM card 112 includes multiple profiles 114a-114e, which may be referred to herein collectively or singularly as profiles 114. The SIM card 112 may include more or fewer profiles 114 depending on configurations. The profiles 114 may relate to operators of wireless communication networks, brands of electronic devices that serve as UEs, operating systems for the electronic devices, etc., and may be referred to as SIM profiles. The SIM card 112 also includes logic, which in configurations, is in the form of a profile change application or applet 116, e.g., a profile management application, for switching among the profiles 114.

When the UE 110 initially receives the SIM card 112, one profile 114a may already be activated. The profile 114a may be activated at the manufacturing site that manufactured the SIM card 112, by a representative of the wireless communication network 102, or manually by a user of the UE 110. The UE 110 is activated, e.g., turned on, within the wireless communication network 102 and registers with the wireless communication network 102 by registering with one or more of the HLR node 104, the billing node 106 and/or the OTA platform 108. When the UE 110 registers with the wireless communication network 102, the UE 110 receives a location status update from the wireless communication network 102.

Upon receiving the location status update, the location status update may be provided to the profile change application 116. The profile change application 116 may then send a message or notification, which in configurations, is a SMS message, to the OTA platform 108 of the wireless communication network 102. As previously noted, if the SMS message goes through the wireless communication network 102, this indicates the SMS message is successful. If the SMS message is not successful, the UE 110 returns an error to the SIM card 112 so the SIM card 112 and the/or the profile change application 116 knows the current profile 114a is not currently activated in the wireless communication network's billing platform.

If the SMS message is successful, then the current activated profile 114a is maintained, e.g., connectivity with the wireless communication network 102 may be maintained, and the profile change application 116 is disabled. If the SMS message fails, then the UE 110 may wait for a status command. As is known, the status command is a periodic message or event received by the UE 110 from the wireless communication network 102. After a predetermined threshold of status commands are received by the UE 110, e.g., 2, 3, 4, or more, the profile change application 116 sends a second message, e.g., a SMS message, to the OTA platform 108. If the second SMS message is successful, then the SIM card 112 will continue to operate in accordance with the current SIM profile 114a, e.g., connectivity with the wireless communication network 102 may be maintained, and the profile change application 116 may be disabled.

If the second SMS message is not successful, then the profile change application 116 may switch profiles 114, e.g., switch from profile 114a to 114b, and the process repeats. For example, the UE 110 receives another location status update and then sends a third SMS message. If the third SMS message is successful, then the SIM card 112 will continue to operate in accordance with the SIM profile 114b, e.g., connectivity with the wireless communication network may be maintained, and the profile change application 116 may be disabled. However, if the third SMS message is not successful, then the UE 110 receives the predetermined number of status commands. Once the predetermined number or threshold of status commands is reached, then the profile change application 116 sends a fourth SMS message to the OTA platform 108. If the fourth SMS message is successful, then the SIM card 112 maintains the new SIM profile 114b, e.g., connectivity with the wireless communication network 102 may be maintained, and operates accordingly. The profile change application 116 may also be disabled. If the fourth SMS message is not successful, then the profile change application 116 switches to, e.g., activates, yet another profile, e.g., from profile 114b to profile 114c. The profile change application 116 may refresh and the process may then repeat.

In configurations, if the location status update is not received within a predetermined amount of time, or is not received at all, the UE 110 may wait for the predetermined number of status commands and once that threshold is reached, then the profile change application 116 sends a SMS message to the OTA platform 108 and the profile change application 116 determines if the SMS message is successful. In configurations, the predetermined amount of time for receiving the location status update is configurable using a STATUS command between the UE 110 and the SIM 112. The UE 110 sends STATUS commands to the SIM card 112 periodically and thus using the STATUS command, the SIM card 112 may calculate time and based on the configuration, the SIM card 112 may perform next steps.

If the SMS message is successful, then the SIM card 112 maintains the current profile 114, e.g., connectivity with the wireless communication network 102 may be maintained, and the profile change application 116 may be disabled. If the SMS message is not successful, then the profile change application 116 may switch profiles 114, as previously described, and the process may repeat itself. In configurations, the process may repeat based at least in part on a threshold number of new profiles 114 not being previously selected, e.g., the total number of profiles 114 on the SIM card 112.

In configurations, a user of the UE 110 may manually switch profiles 114. In such configurations, a user interface may be presented to the user on the UE 110 and the user interface may ask the user if they wish to switch profiles 114. Additionally, a list of available profiles 114 on the SIM card 112 may be presented to the user from which the user may select a desired profile 114. This can allow for the user to operate the UE 110 within multiple wireless communication networks and manually switch to the appropriate profile 114 depending on the operator of the wireless communication network. In such configurations, the profile change application 116 may be disabled prior to the manual switching of profiles 114 by the user.

Figure 2:
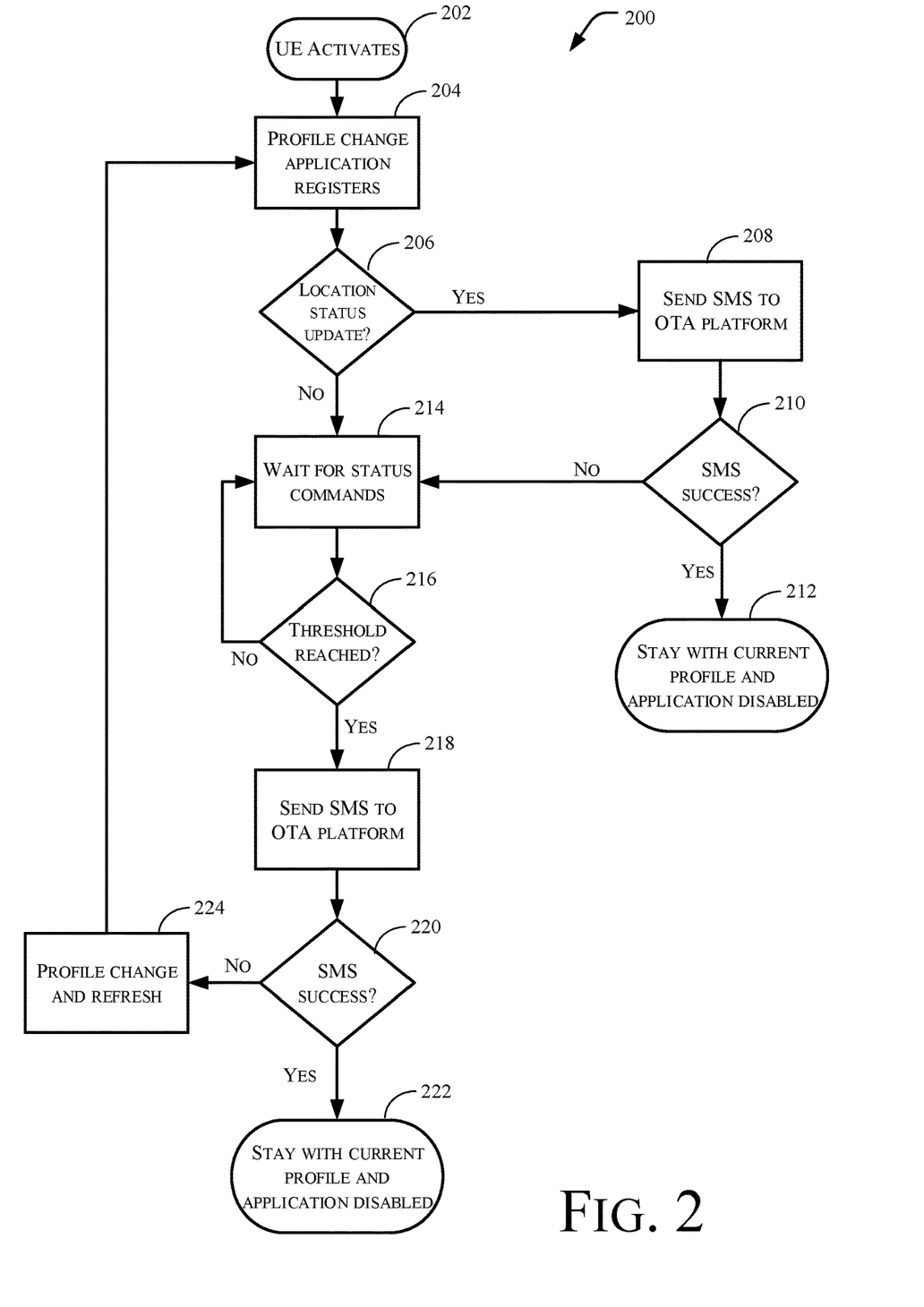
FIG. 2 is a flow diagram of an example process for changing among profiles of multiple profiles on a SIM card of an electronic device, in accordance with various configurations.

FIG. 2 is a flow diagram of an example process 200 for changing profiles, e.g., profiles 114, of multiple profiles on a SIM card, e.g., SIM card 112, of a UE, e.g., UE 110. At block 202, the UE activates. For example, the UE activates or "turns on" within a wireless communication network, e.g., wireless communication network 102. At block 204, a profile change application registers on events. For example, the profile change application 116 registers on the wireless communication network based on location status updates and status commands. At block 206, it is determined if a location status update has been received. If a location status update has been received, then the process 200 proceeds to block 208, where a message, e.g., a SMS message, is sent by the profile change application to an OTA platform, e.g., OTA platform 108, of the wireless communication network.

The process 200 then proceeds to block 210 where it is determined if the SMS message was a success. If the SMS message was a success, then the process 200 proceeds to block 212, where the current profile is maintained on the SIM card and the profile change application is disabled. If the SMS message was not a success, then the process proceeds to block 214. Likewise, if a location status update is not received within a predetermined amount of time at bock 206, then the process 200 proceeds to block 214.

At block 214, status commands are received. At block 216, it is determined if a threshold number of status commands have been received. If not, then the process 200 returns to block 214 to wait for further status commands to be received. If the threshold number of status commands has been received, then the process 200 proceeds to block 218, where the profile change application sends a second SMS message to the OTA platform. At block 220, it is determined if the second SMS message was a success. If the second SMS message was a success, then the process 200 proceeds to block 222, where the current profile is maintained on the SIM card and the profile change application is disabled. However, if the second SMS message is not a success, then the process 200 proceeds to block 224, where the profile change application changes profiles on the SIM card and refreshes. From block 224, the process 200 returns to block 204 and the process 200 repeats.

Figure 3:
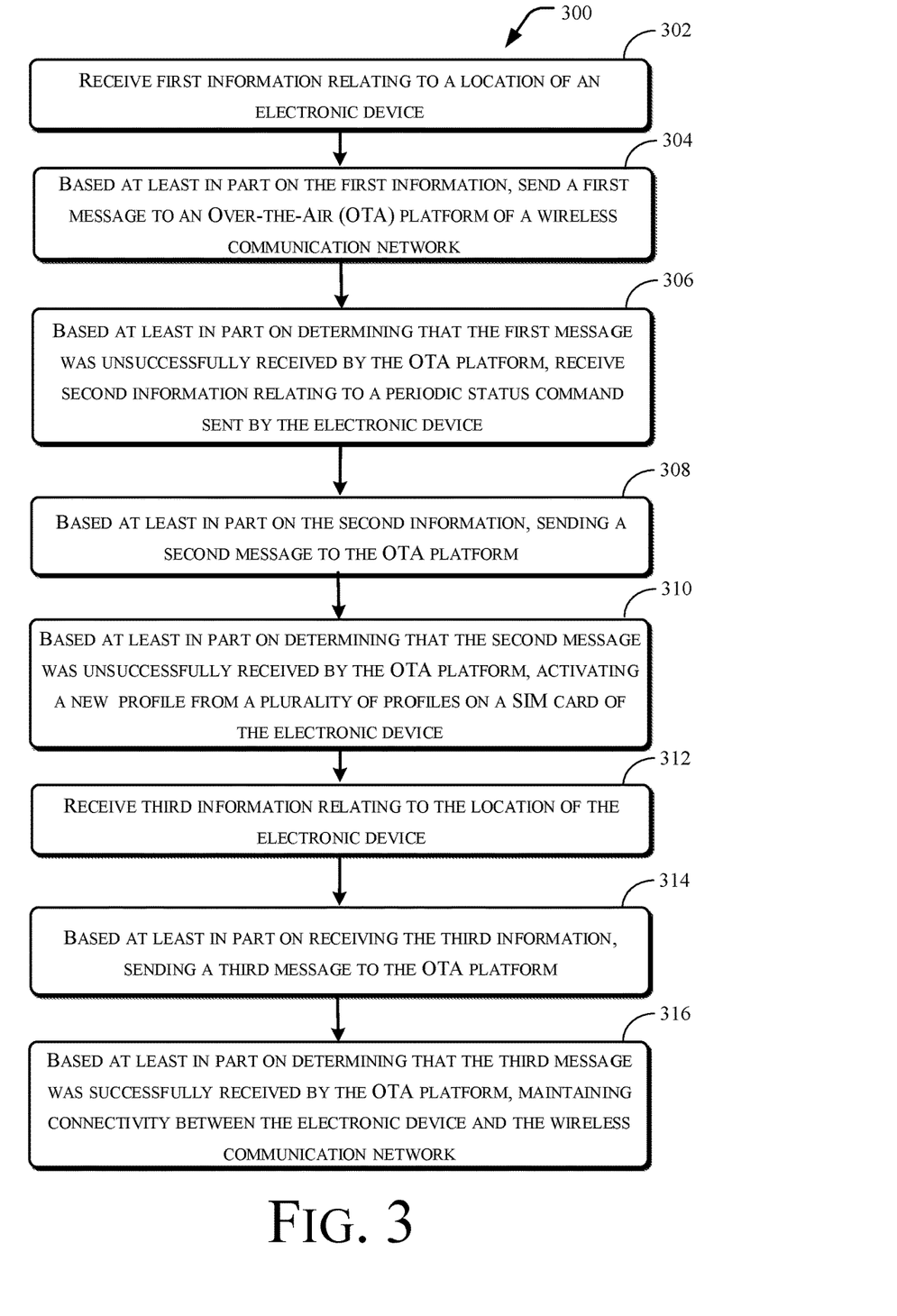
FIG. 3 is a flow diagram of another example process for changing among profiles of multiple profiles on a SIM card of an electronic device, in accordance with various configurations.

FIG. 3 is a flow diagram of another example process 300 for changing profiles, e.g., profiles 114, of multiple profiles on a SIM card, e.g., SIM card 112, of an electronic device, e.g., UE 110. At block 302, first information relating to a location of the electronic device is received. At block 304, based at least in part on receiving the first information, a first message is sent to an over-the-air (OTA) platform of a wireless communication network. For example, a profile management application, e.g., profile change application 116, may send a SMS message to the OTA platform, e.g., OTA platform 108. At block 306, based at least in part on determining that the first message was unsuccessfully received by the OTA platform, second information relating to a periodic status command sent by the electronic device is received.

At block 308, based at least in part on receiving the first information, a second message is sent to the OTA platform. For example, the profile management application may send a second SMS message to the OTA platform. At block 310, based at least in part on determining that the second message was unsuccessfully received by the OTA platform, activating a new profile from a plurality of profiles on a SIM card of the electronic device. For example, the profile management application may activate a new profile, e.g., profile 114, on the SIM card, e.g., SIM card 112.

At block 312, third information relating to the location of the electronic device is received. At block 314, based at least in part on receiving the third information, a third message is sent to the OTA platform. For example, the profile management application may send a third SMS message to the OTA platform. At block 316, based at least in part on determining that the third message was successfully received by the OTA platform, connectivity is maintained between the electronic device and the wireless communication network.

Figure 4:
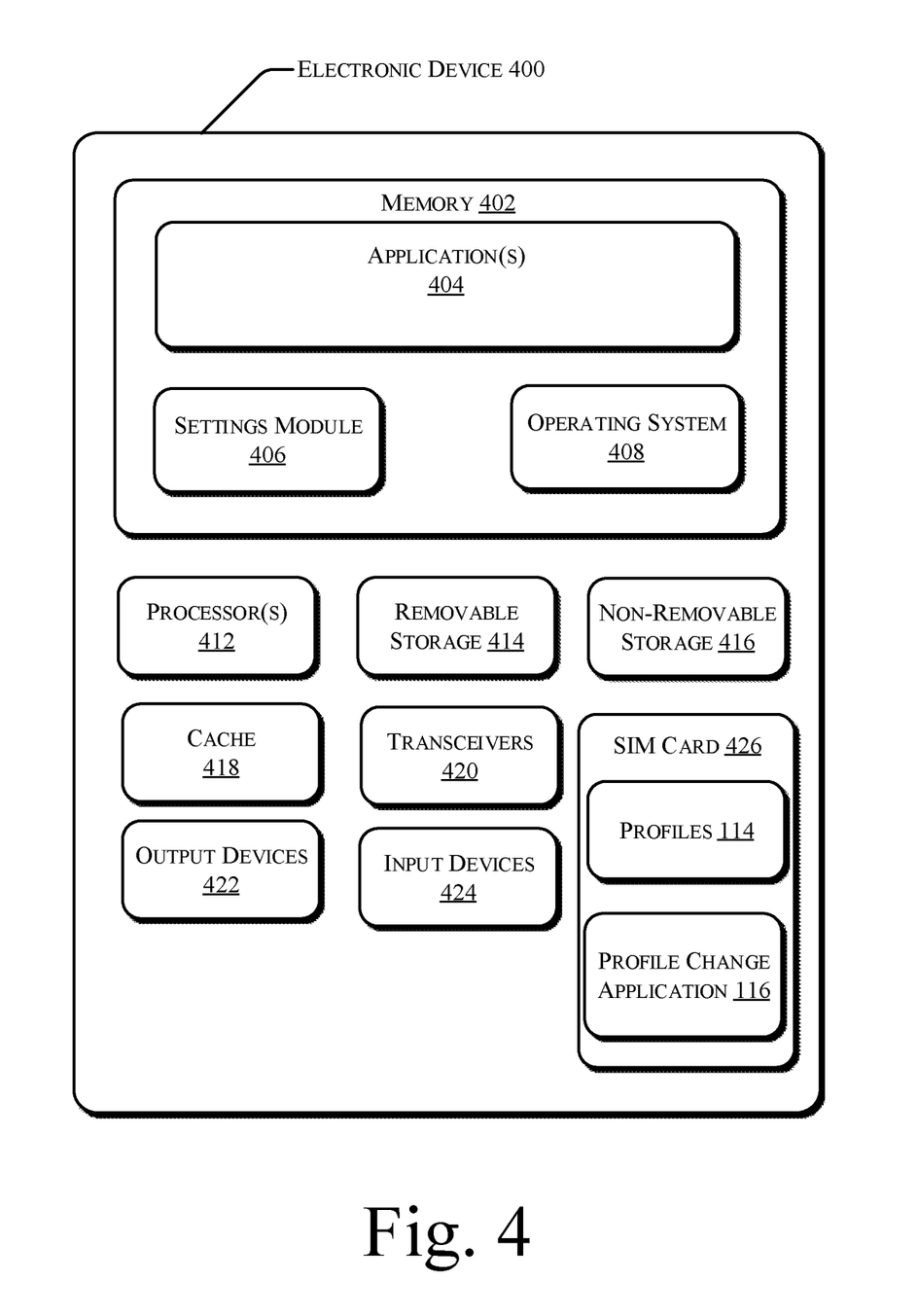
FIG. 4 schematically illustrates a component level view of an example electronic device configured for use in the wireless communication network of FIG. 1, in accordance with various configurations.

FIG. 4 schematically illustrates a component level view of an example electronic device 400, such as UE 110, configured to function within wireless communication network 102. The electronic device 400 may include more or less components depending on the type of electronic device. As illustrated, the electronic device 400 comprises a system memory 402, e.g., computer-readable media, storing application(s) 404. The mobile device also comprises a settings module 406, and an operating system 408. Also, the electronic device 400 includes processor(s) 412, a removable storage 414, a non-removable storage 416, cache 418, transceivers 420, output device(s) 422, and input device(s) 424. The electronic device 400 also includes a SIM card 426 that includes multiple profiles 114 and profile change application 116.

In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna (not shown). Also, or alternatively, the transceivers 420 may include wireless modem(s) to facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Memory 402 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
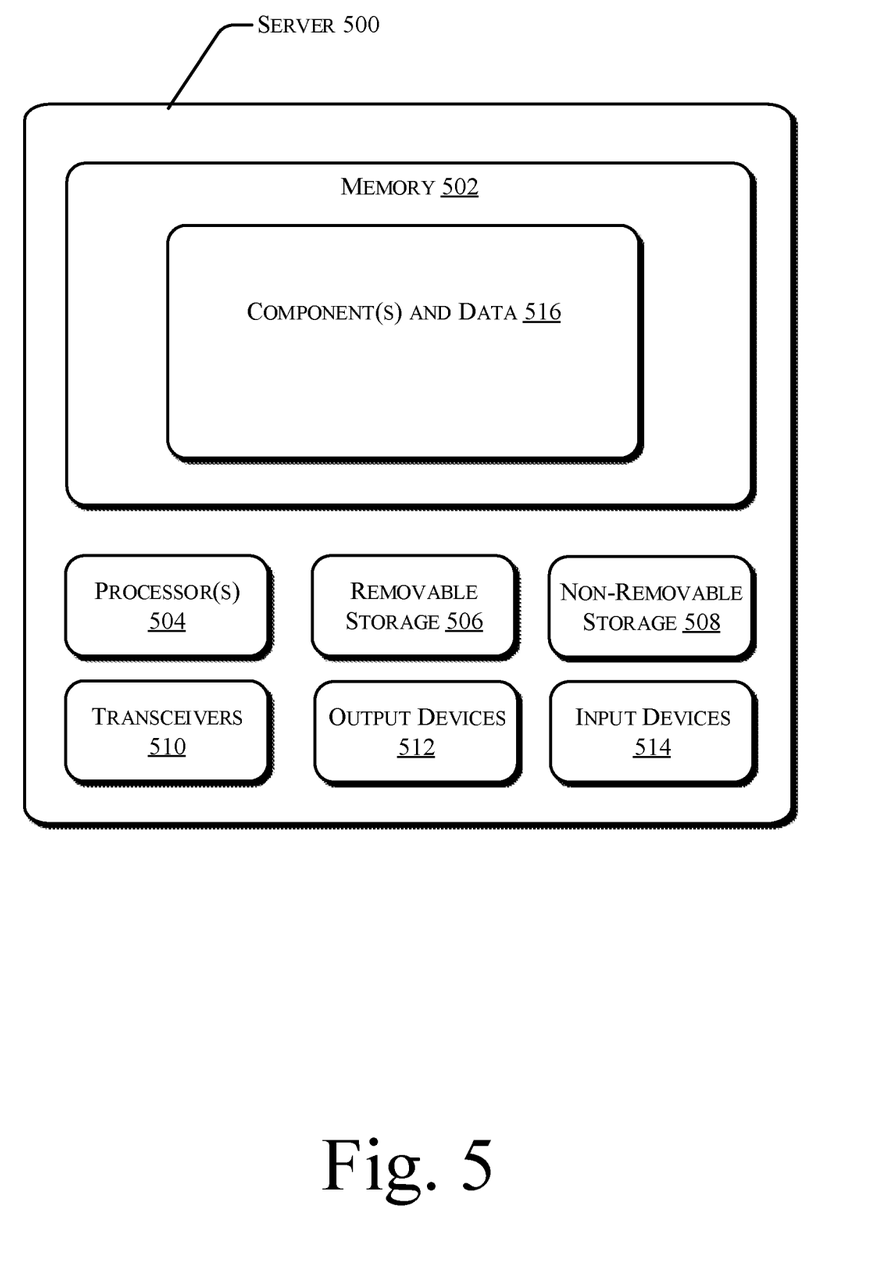
FIG. 5 schematically illustrates a component level view of a server configured for use with the example arrangement of FIG. 1 to provide various services, in accordance with various configurations.

FIG. 5 illustrates a component level view of a server 500 configured for use within a wireless communication network, e.g., wireless communication network 102 in order to provide various services for and/or within the wireless communication network, according to the techniques described herein. For example, one or more servers 500 may be configured to operate as the HLR node 104, billing node 106 or the node configured as the OTA platform 108. As illustrated, the server 500 comprises a system memory 502 that may store one or more components and/or applications and data 516 for interacting with electronic devices 500, e.g., UE 110, or other electronic devices that may be configured as connected devices, as described herein. Also, the server 500 may include processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include module(s) and data 516 (illustrated in the memory 502). The module(s) and data 516 may also include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead of, the transceivers 510 may include wireless modem(s) to facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 402 and memory 502 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving first information relating to a location of an electronic device;
   based at least in part on receiving the first information, sending a first message to an over-the-air (OTA) platform of a wireless communication network;
   based at least in part on determining that the first message was unsuccessfully received by the OTA platform, receiving second information relating to a periodic status command sent by the electronic device;
   based at least in part on receiving the first information, sending a second message to the OTA platform;
   based at least in part on determining that the second message was unsuccessfully received by the OTA platform, activating a new profile from a plurality of profiles on a SIM card of the electronic device;
   receiving third information relating to the location of the electronic device;
   based at least in part on receiving the third information, sending a third message to the OTA platform; and based at least in part on determining that the third message was successfully received by the OTA platform, maintaining connectivity between the electronic device and the wireless communication network.

2. The method of claim 1, wherein sending the second message to the OTA platform is further based at least in part on a threshold of periodic status commands being sent by the electronic device.

3. The method of claim 1, further comprising:
prior to receiving the first information, activating an original profile from the plurality of SIM profiles on the SIM card.

4. The method of claim 3, wherein activating the original profile comprises activating the original profile with at least one of a home location register (HLR) of the wireless communication network, a billing platform of the wireless communication network, or the OTA platform.

5. The method of claim 1, wherein selecting the new profile from the plurality of profiles on the SIM card is based at least in part on a threshold number of new profiles not being previously selected.

6. The method of claim 1, wherein the first message, the second message, and the third message each comprise a short message service (SMS) message.

7. The method of claim 1, further comprising:
based at least in part on maintaining connectivity between the electronic device and the wireless communication network, disabling a profile management application included on the electronic device.

8. An apparatus comprising:
one or more processors; and
a non-transitory storage medium comprising instructions stored thereon, the instructions being executable by the one or more processors to cause the processors to perform one or more actions comprising:
receiving first information relating to a location of an electronic device;
based at least in part on receiving the first information, sending a first message to an over-the-air (OTA) platform of a wireless communication network;
based at least in part on determining that the first message was unsuccessfully received by the OTA platform, receiving second information relating to a periodic status command sent by the electronic device;
based at least in part on receiving the first information, sending a second message to the OTA platform;
based at least in part on determining that the second message was unsuccessfully received by the OTA platform, activating a new profile from a plurality of profiles on a subscriber identity module (SIM) card of the electronic device;
receiving third information relating to the location of the electronic device;
based at least in part on receiving the third information, sending a third message to the OTA platform; and
based at least in part on determining that the third message was successfully received by the OTA platform, maintaining connectivity between the electronic device and the wireless communication network.

9. The apparatus of claim 8, wherein sending the second message to the OTA platform is further based at least in part on a threshold of periodic status commands being sent by the electronic device.

10. The apparatus of claim 8, wherein the actions further comprise:
prior to receiving the first information, activating an original profile from the plurality of profiles on the SIM card.

11. The apparatus of claim 10, wherein activating the original SIM profile comprises activating the original profile with at least one of a home location register (HLR) of the wireless communication network, a billing platform of the wireless communication network, or the OTA platform.

12. The apparatus of claim 8, wherein selecting the new profile from the plurality of profiles on the SIM card is based at least in part on a threshold number of new profiles not being previously selected.

13. The apparatus of claim 8, wherein the first message, the second message, and the third message each comprise a short message service (SMS) message.

14. The apparatus of claim 8, wherein the actions further comprise:
based at least in part on maintaining connectivity between the electronic device and the wireless communication network, disabling a profile management application included on the electronic device.

15. A non-transitory storage medium comprising instructions stored thereon, the instructions being executable by one or more processors to perform actions comprising:
receiving first information relating to a location of an electronic device;
based at least in part on receiving the first information, sending a first message to an over-the-air (OTA) platform of a wireless communication network;
based at least in part on determining that the first message was unsuccessfully received by the OTA platform, receiving second information relating to a periodic status command sent by the electronic device;
based at least in part on receiving the first information, sending a second message to the OTA platform;
based at least in part on determining that the second message was unsuccessfully received by the OTA platform, activating a new profile from a plurality of profiles on a subscriber identity module (SIM) card of the electronic device;
receiving third information relating to the location of the electronic device;
based at least in part on receiving the third information, sending a third message to the OTA platform; and
based at least in part on determining that the third message was successfully received by the OTA platform, maintaining connectivity between the electronic device and the wireless communication network.

16. The non-transitory storage medium of claim 15, wherein sending the second message to the OTA platform is further based at least in part on a threshold of periodic status commands being sent by the electronic device.

17. The non-transitory storage medium of claim 15, wherein the actions further comprise:
prior to receiving the first information, activating an original profile from the plurality of profiles on the SIM card.

18. The non-transitory storage medium of claim 17, wherein activating the original SIM profile comprises activating the original profile with at least one of a home location register (HLR) of the wireless communication network, a billing platform of the wireless communication network, or the OTA platform.

19. The non-transitory storage medium of claim 15, wherein selecting the new SIM profile from the plurality of profiles on the SIM card is based at least in part on a threshold number of new profiles not being previously selected.

20. The non-transitory storage medium of claim 15, wherein the actions further comprise:

based at least in part on maintaining connectivity between the electronic device and the wireless communication network, disabling a profile management application included on the electronic device.

* * * * *